United States Patent
Li et al.

(10) Patent No.: US 7,362,498 B1
(45) Date of Patent: Apr. 22, 2008

(54) METHOD AND APPARATUS FOR CONTROLLING A SEMICONDUCTOR OPTICAL AMPLIFIER FOR USE IN A PASSIVE OPTICAL NETWORK

(75) Inventors: Ruoding Li, Carlisle, MA (US); Daniel B. Grossman, Norwood, MA (US); William Weeks, Ivyland, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 11/616,952

(22) Filed: Dec. 28, 2006

(51) Int. Cl.
*H01S 3/00* (2006.01)
(52) U.S. Cl. .................. 359/341.41; 359/344
(58) Field of Classification Search .......... 359/341.41, 359/344
See application file for complete search history.

(56) References Cited

U.S. PATENT DOCUMENTS

| 6,067,187 | A | * | 5/2000 | Onaka et al. | 359/337.11 |
| 6,160,659 | A | * | 12/2000 | Kinoshita | 359/337 |
| 6,721,090 | B2 | * | 4/2004 | Akiyama | 359/341.3 |
| 6,738,184 | B2 | * | 5/2004 | Hayashi et al. | 359/341.4 |
| 7,027,210 | B2 | * | 4/2006 | Tian et al. | 359/333 |
| 7,068,423 | B2 | * | 6/2006 | Vella et al. | 359/341.42 |
| 2007/0019285 | A1 | * | 1/2007 | Tamaoki et al. | 359/341.41 |

* cited by examiner

*Primary Examiner*—Mark Hellner
(74) *Attorney, Agent, or Firm*—Larry T. Cullen

(57) ABSTRACT

An optical amplifier including: an amplifier having an input port and an output port, which is disposed along a main signal line of the optical amplifier; a dummy laser generation circuit having an output coupled to the main signal line and operative for inputting a dummy signal into the amplifier; a first optical detector for detecting a power level of the dummy signal into the amplifier and outputting a first power level signal; a second optical detector for detecting an amplified power level of the dummy signal output by the amplifier and outputting a second power level signal; a memory device for storing calibration data regarding the gain characteristics of the amplifier; and a gain control circuit which receives inputs from the first optical detector and second optical detector, and has an output coupled to the amplifier. The gain control circuit operates to control the gain of the amplifier based on the first power level signal, the second power level signal and the calibration data.

19 Claims, 4 Drawing Sheets

METHOD AND APPARATUS FOR CONTROLLING A SEMICONDUCTOR OPTICAL AMPLIFIER FOR USE IN A PASSIVE OPTICAL NETWORK

FIELD OF THE INVENTION

The present invention relates to a method and apparatus for controlling a semiconductor optical amplifier for use in a passive optical network, and more specifically, to a method and apparatus for maintaining the gain of the semiconductor optical amplifier at predetermined level during normal operation of the passive optical network.

BACKGROUND OF INVENTION

Various current communication systems utilize passive optical network (PON) technology. Network operators presently utilize PONs to provide broadband communications services, such as data, subscription television and telephony, to homes and small businesses. Such PON systems typically can support a maximum optical fiber reach of 20 km (i.e., from the central office to the subscriber), and a maximum "split ratio" of 32 subscribers per feeder fiber. These limits are due to limitations in optical transmitter power output and optical receiver sensitivity in commercially available components. One way to extend the reach and increase the split ratio of a PON is to use optical amplifiers to compensate for the additional fiber and optical splitter losses. It is noted that the invention discussed below focuses on Gigabit-capable PON (GPON), ITU-T Recommendation G.984. However, it is also applicable to other PON technologies, including but not limited to, Broadband PON (BPON, ITU-T Recommendation G.983) and Gigabit Ethernet PON (GEPON, IEEE 802.3ah).

Existing PONs typically operate on a wavelength plan of approximately 1490 nm in the downstream direction, and 1310 nm in the upstream direction. In order to use the same wavelength band for extended range and/or larger split ratio, semiconductor optical amplifiers (SOAs) are presently a primary cost effective technology which can be designed for use in 1490 nm and 1310 nm wavelength band.

An SOA typically has an approximately 40 nm useable waveband. The standardized downstream GPON waveband is in the range of 1480 nm to 1500 nm, or about 20 nm wide. For upstream transmission, the current GPON standards specify a waveband of 1260 nm to 1360 nm, or about 100 nm wide. Typical upstream lasers actually operate at around 1310 nm, with a waveband which is about 20 nm to 30 nm wide. In order to reduce the SOA's amplified spontaneous emission (ASE) noise contribution to the upstream signal quality, the upstream signal band should be limited to about 20 nm, such as from 1300 nm to 1320 nm, e.g., using a coarse wavelength division multiplexed (CWDM) laser.

FIG. 1 illustrates a typical amplified PON system 10. Referring to FIG. 1, the system includes an optical network unit (ONU) 12, a 1×N optical coupler 14 (as a variation, 2×N optical couplers are utilized in protected PON designs), a first wavelength division multiplexer (WDM) 16 and a second wavelength division multiplexer 18, which are coupled to a first SOA 20 and a second SOA 22. In the given embodiment, the first SOA 20 amplifies signals propagating in the downstream direction, and the second SOA 22 amplifies signals propagating in the upstream direction. The system 10 further includes an optical line terminator OLT, which is located in the central office. As shown, the OLT includes a transmitter 26, a receiver 28, and a WDM 32, which couples both the transmitter 26 and the receiver 28 to the feeder fiber.

With respect to the operation, when an ONU 12 has data to send, and further has received a transmission grant as defined in the PON protocol, the ONU 12 sends a burst of data in the upstream direction, through one (or more) SOA 22 to the OLT in the central office. The amplified PON 10 has a plurality of ONUs 12 coupled to the first SOA 22 and feeder fiber by the N-port optical coupler 14. Thus, in the upstream direction, the coupler 14 combines the output signals from the ONUs 12, and couples the combined signal to the input of the first upstream SOA 22, by way of the WDM filter 16. The received power level at the upstream SOA 22 may vary between ONUs 12, due, e.g., to differences in the lengths of distribution fibers and to variations in ONU transmitter output power. Thus, the upstream input signal at the SOA 22 will have wide dynamic range over timescales of the order of 1 µs to 10s of µs or more.

Optical amplifiers, such as SOAs, are typically designed to be either constant gain or constant power amplifiers. In the PON application, the downstream SOA 20 may be either constant gain or constant power. However, for the upstream SOA 22, constant gain operation is necessary due to differences in input signal level from the different ONUs 12, and the use of burst mode operation for transmitting data in the upstream direction.

It is well known that semiconductor devices experience permanent changes in their crystalline structure over time and use, which affects their performance. Due to this aging effect, SOA gain will drift over time. Thus, proper means to monitor and compensate for gain variation must be implemented. However, measurement of gain of upstream SOA 22 with sufficient accuracy to monitor and compensate for aging is made difficult by the dynamic range of the upstream input signal.

Accordingly, there is a need for an effective, cost sensitive method and apparatus for controlling the gain of SOA's utilized in the upstream direction in PON applications, which at the same time could provide for an optical supervisory channel for communication between the central office (CO) and a remote node. It is an object of the present invention to provide a method and apparatus which achieves these objectives.

SUMMARY OF INVENTION

Accordingly, the present invention relates to a system and method for maintaining the gain of a semiconductor optical amplifier at a predetermined level during the normal operation of the device, even when the device is processing burst data in the upstream direction.

More specifically, the present invention relates to an optical amplifier including: an amplifier having an input port and an output port, which is disposed along a main signal line of the optical amplifier; a dummy laser generation circuit having an output coupled to the main signal line and operative for inputting a dummy signal into the amplifier; a first optical detector for detecting a power level of the dummy signal into the amplifier and outputting a first power level signal; a second optical detector for detecting an amplified power level of the dummy signal output by the amplifier and outputting a second power level signal; a memory device for storing calibration data regarding the gain characteristics of the amplifier; and a gain control circuit which receives inputs from the first optical detector and second optical detector, and has an output coupled to the amplifier. The gain control circuit calculates the gain of the SOA based on the first power level signal, the second power level signal and the calibration data. The gain control circuit further forms a feedback loop which operates upon the calculated gain to maintain said gain at a predetermined level, e.g. by adjusting the drive current into the SOA.

The present invention also relates to a method for controlling the gain of an optical amplifier. The method includes the steps of storing calibration data regarding the gain characteristics of the amplifier in a memory device, e.g., during assembly; coupling a dummy signal onto a main signal line of the optical amplifier, and inputting the dummy signal into an amplifier, where the dummy signal is coupled with an upstream data signal prior to being input into the amplifier; detecting a power level of the dummy signal input into the amplifier and outputting a first power level signal; detecting an amplified power level of the dummy signal output by the amplifier and outputting a second power level signal; and controlling the gain of the amplifier based on the first power level signal, the second power level signal and the calibration data such that the gain of the amplifier is maintained at a predetermined level during operation of the optical amplifier.

The present invention provides significant advantages over the prior art systems. Most importantly, the present invention provides a PON network utilizing an SOA that provides for the processing of upstream burst data signals while maintaining the gain of the SOA at a predetermined level despite device aging, utilizing a simple, cost effective circuit.

Additional advantages of the present invention will become apparent to those skilled in the art from the following detailed description of exemplary embodiments of the present invention.

The invention itself, together with further objects and advantages, can be better understood by reference to the following detailed description and the accompanying drawings.

BRIEF DESCRIPTION OF THE DRAWINGS

The following drawings serve to illustrate the principles of the invention.

DETAILED DESCRIPTION OF THE INVENTION

Figure 1:
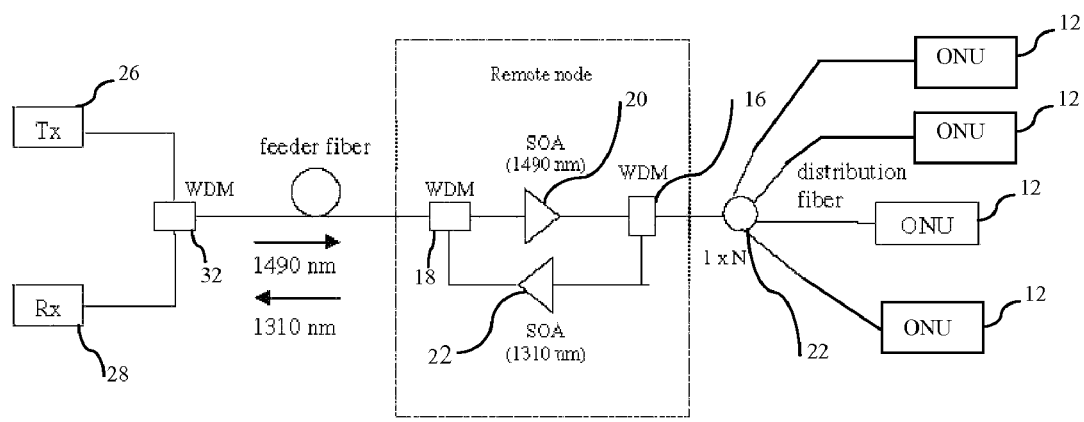
FIG. 1 illustrates an exemplary prior art PON design.
Figure 2:
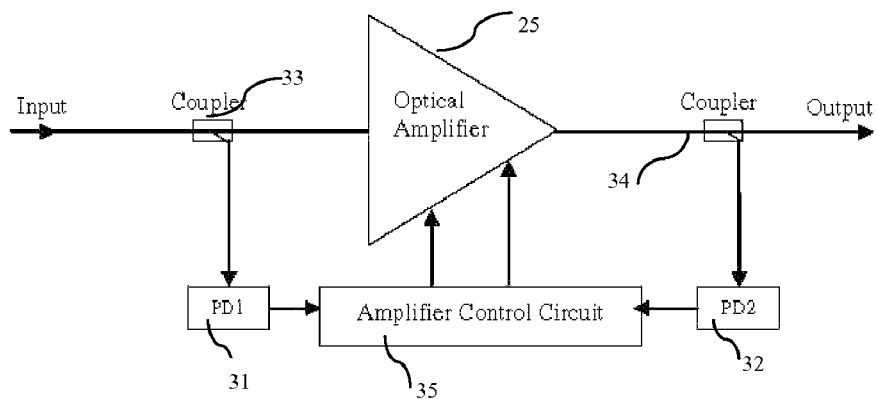
FIG. 2 illustrates a prior art SOA configuration.

Prior to discussing the present invention, a brief discussion of prior art techniques for controlling optical amplifiers, such as SOAs and erbium-doped fiber amplifiers (EDFA), is provided to facilitate an understanding of the present invention. FIG. 2 illustrates an exemplary prior art approach for controlling optical amplifiers in a typical fiber communications application. Referring to FIG. 2, the photo detector 31 at the input measures the input optical signal level via coupler 33, and photo detector 32 at the output of the optical amplifier 25 measures the output optical signal via coupler 34. An amplifier control circuit 35 utilizes these measured optical signal levels to determine the gain of the optical amplifier 25. The amplifier control circuit 35 further utilizes a feedback control circuit to control the optical amplifier to attempt to maintain either constant gain or constant output power. In prior art systems, optical amplifiers are designed to deal with nearly constant average optical signals, as produced by point-to-point transmission systems such as SONET or Ethernet. Since the average optical input signal level to the optical amplifier 25 is nearly constant, relatively slow optical detectors 31 and 32 can be utilized to measure the optical signal average power. However, the signal level of the PON upstream optical signal varies from burst to burst, depending upon which ONUs sent the signal. Therefore, the traditional control scheme shown in FIG. 2 used for controlling optical amplifiers is not suitable for controlling an upstream amplifier in a PON application.

Figure 3:
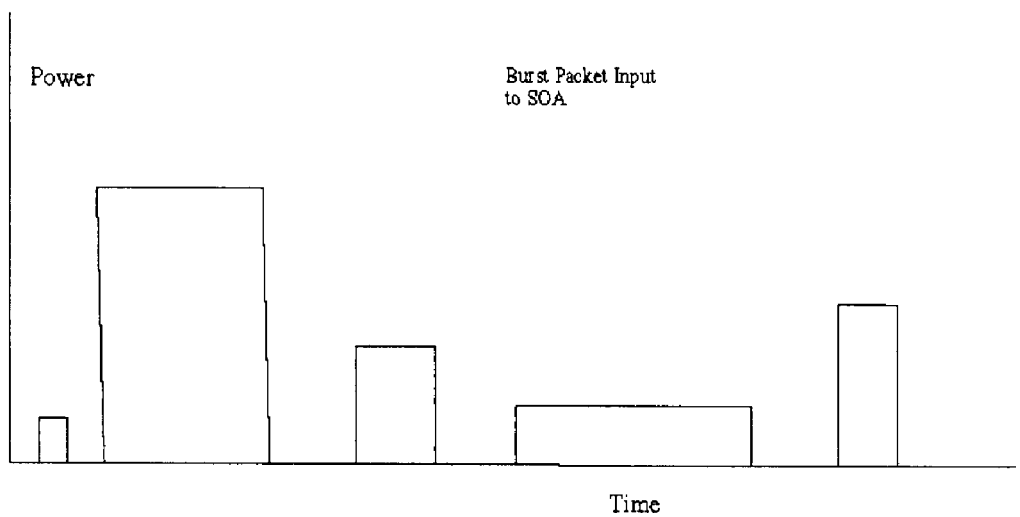
FIG. 3 illustrates an exemplary burst data signal input into the SOA.

FIG. 3 illustrates an example of the wide dynamic signal level at the input of the upstream SOA 25 and the varying duration of upstream bursts. These variations in the input signal level makes it difficult to design a control circuit that accurately compares the input signal with the output signal, resulting in inaccurate reading of the SOA gain. As such, as noted above and shown in FIG. 2, a feedback loop is necessary to monitor input and output levels of the SOA so as to measure gain and to allow for the adjustment of drive current to maintain a pre-determined level. Furthermore, as an SOA ages, the SOA typically requires higher drive current to maintain its pre-determined gain setting. It is noted that an alarm may be generated when the drive current exceeds a pre-determined threshold, to indicate that the SOA is close to end-of-life. Thus, input and output optical signal power levels to the SOA must be accurately measured despite the dynamic range and varying duration of optical bursts at the input to the SOA.

As explained in detail below, the present invention relates to a method and apparatus which is capable of maintaining the gain and output power level of the SOA at the desired level, notwithstanding the variations in the input signal level, due to, for example, burst mode operation, and aging of various components, such as the SOA and the ONU components. It is noted that the present invention is particularly applicable to the upstream signal path of the PON, as the upstream mode of operation allows for a burst mode (the downstream signal is typically continuous and from a single source).

Figure 4:
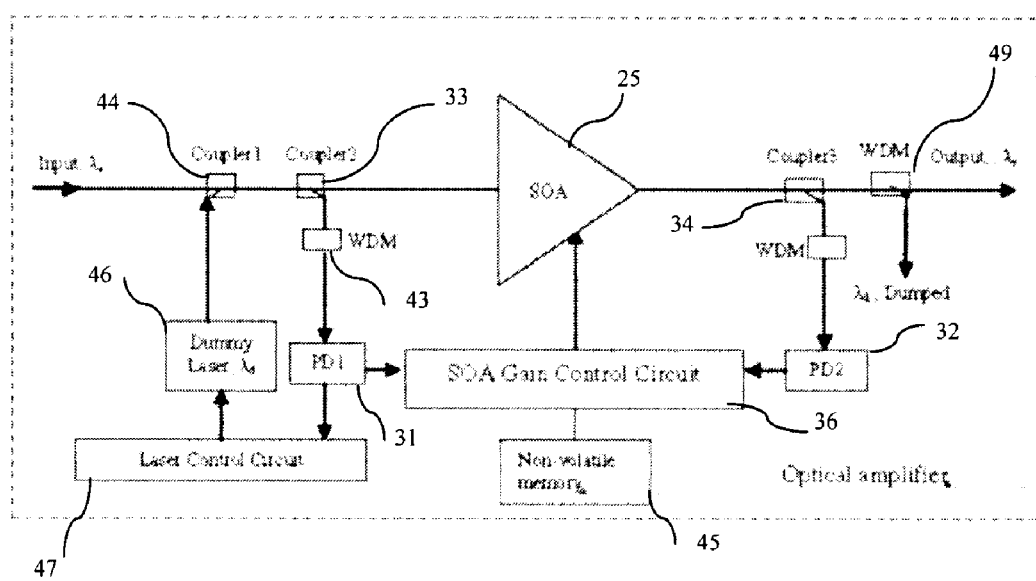
FIG. 4 illustrates an exemplary embodiment of an SOA control circuit in accordance with the present invention.

FIG. 4 illustrates an exemplary embodiment of an SOA circuit 40 of the present invention. The SOA circuit 40 contains the same basic configuration as the SOA circuit illustrated in FIG. 2 (which are indicated by the same reference numerals), but includes the following additional components. Referring to FIG. 4, the additional components include a laser control unit 47 which is coupled to a dummy laser 46. The dummy laser 46 is coupled to the main signal line by coupler 44. Further, a WDM filter 43 is coupled between coupler 33 and the first optical detector 31. The output of first optical detector 31 is also coupled to the laser control circuit 47. Continuing a non-volatile memory 45 is coupled to an SOA gain control circuit 36. Finally, a WDM filter 37 is coupled between coupler 34 and the optical detector 32, and another WDM filter 49 is disposed on the main signal line at the output of the device.

With regard to the operation of the exemplary embodiment shown in FIG. 4, a signal from the dummy laser 46 is coupled into the SOA 25 input port, along with the upstream optical input signal, by utilizing the first optical coupler 44. It is noted that the first optical coupler 44 may be, for example, a power coupler or a wave division multiplexing (WDM) filter. The dummy laser 46 has a wavelength $\lambda_d$, which is outside the upstream PON waveband, but within the SOA 25 gain spectrum. The second optical coupler 33 taps a portion of the combined optical signal, and the tapped signal then passes through the WDM optical signal filter 43, which operates to pass the signal at $\lambda_d$, while rejecting the upstream burst optical signal. The output of the WDM optical signal filter 43 is coupled to the first optical detector 31. The first optical detector 31 operates to measure the dummy signal. As explained in further detail below, the dummy signal, as measured by the first optical detector 31, is utilized as the reference for the SOA 25 input level.

At the output port of the SOA 25, the third optical coupler 34 utilized to tap a small portion of the combined amplified optical signal. The second optical WDM filter 37 is utilized to block the upstream burst PON signal, while passing the amplified dummy signal. The second optical detector 32 operates to detect the amplified dummy signal, and the signal level at the second optical detector 32 is utilized as a reference for the SOA output. The output of the third optical coupler 34 may be coupled to an additional optical WDM filter 49, which blocks the amplified dummy laser signal and only passes the amplified upstream burst PON optical signal toward the OLT.

It is noted that the inclusion of the dumping WDM filter 49 in the circuit configuration is optional. For example, if multiple SOAs are needed in an amplified PON design, the dummy signal can be allowed to propagate with the burst signal to the next SOA, which does not need to have its own dummy laser. Further, the dummy laser may also be modulated for use in a simplex communications channel, as will be described further below.

Referring again to FIG. 4, in the given embodiment, the dummy laser 46 generates an unmodulated continuous wave (CW) signal. As such, the signals as measured at the first optical detector 31 and the second optical detector 32 are highly stable and can be used to calibrate the gain setting of the SOA 25. It is noted that standard calibration procedures for calibrating the SOA 25 can be utilized. Once the calibration process is completed, the relative signal levels measured at first optical detector 31 and the second optical detector 32 can be utilized to calculate the SOA gain value as follows. If the light incident on first optical detector 31 results in a photocurrent $I_1$ and the light incident on second optical detector 32 results in photocurrent $I_2$, the overall gain G for the SOA 25 (including the upstream PON signal) is defined by equation 1, which is:

$$G = a(I_2/I_1) \qquad \text{Eq. (1)},$$

where a is the calibration value, which is a constant and is does not change with SOA gain. The calibration constant a is stored in the non-volatile memory 45 once the calibration process is completed. Then, during operation, the SOA gain control circuit 36, which is coupled to first optical detector 31 and the second optical detector 32, and to non-volatile memory 45, operates to control the bias applied to the SOA 25 so as to maintain a constant gain of the SOA 25 during the operation of the device, in accordance with the relationship defined by equation 1.

As discussed above, the upstream PON optical signal should have an optical wavelength range of 20 nm to 30 nm. An SOA typically has approximately 45 nm of gain bandwidth with relatively flat gain over this gain bandwidth (i.e., a variation of about 3 dB). Further, the SOA gain profile typically does not change much during operation. Therefore, maintaining a constant SOA gain at the dummy laser wavelength $\lambda_d$ will ensure that the gain at the PON wavelength of the upstream signal is also kept constant.

Figure 5:
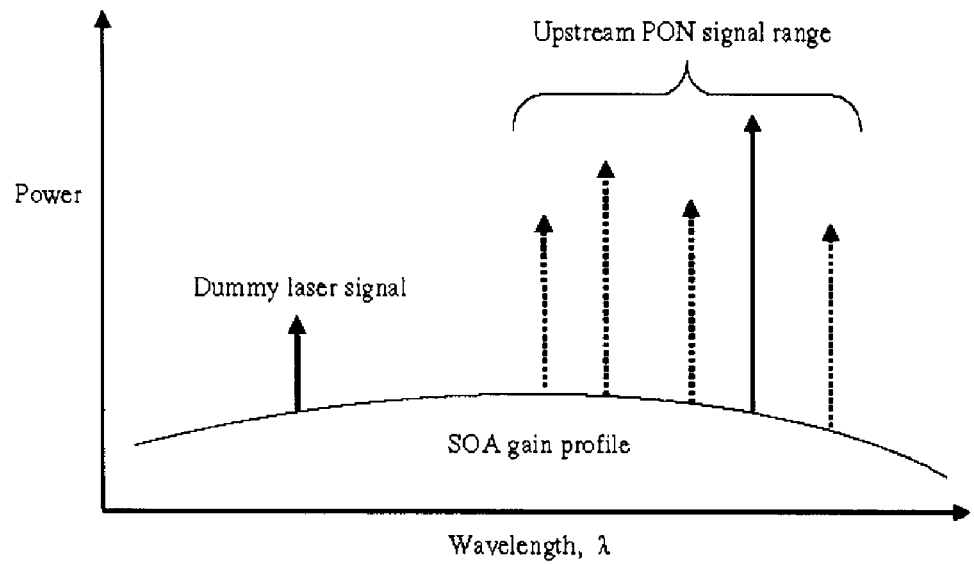
FIG. 5 illustrates an exemplary gain profile of an SOA.

In the given embodiment, because the dummy laser 46 is used only for measurement purposes, it is preferable that the dummy laser have a lower power level (e.g., a few dB lower) than the power level of lowest upstream PON optical signal anticipated at the input to the optical amplifier 25. As a result, the dummy laser signal will have a negligible effect on the operation of SOA 25 operation. FIG. 5 illustrates the SOA gain profile as well as possible wavelengths of the upstream PON optical signal and dummy laser signal relative to the gain profile. FIG. 5 illustrates that the dummy laser wavelength, $\lambda_d$, must be separated from the upstream PON signal range, but must also be within the SOA gain spectrum window.

Thus, as a result of the configuration of the foregoing embodiment, since the dummy laser signal, rather than the upstream burst PON optical signal, is used to control the SOA gain, the SOA gain may be accurately set with a relatively simple control circuit.

Figure 6:
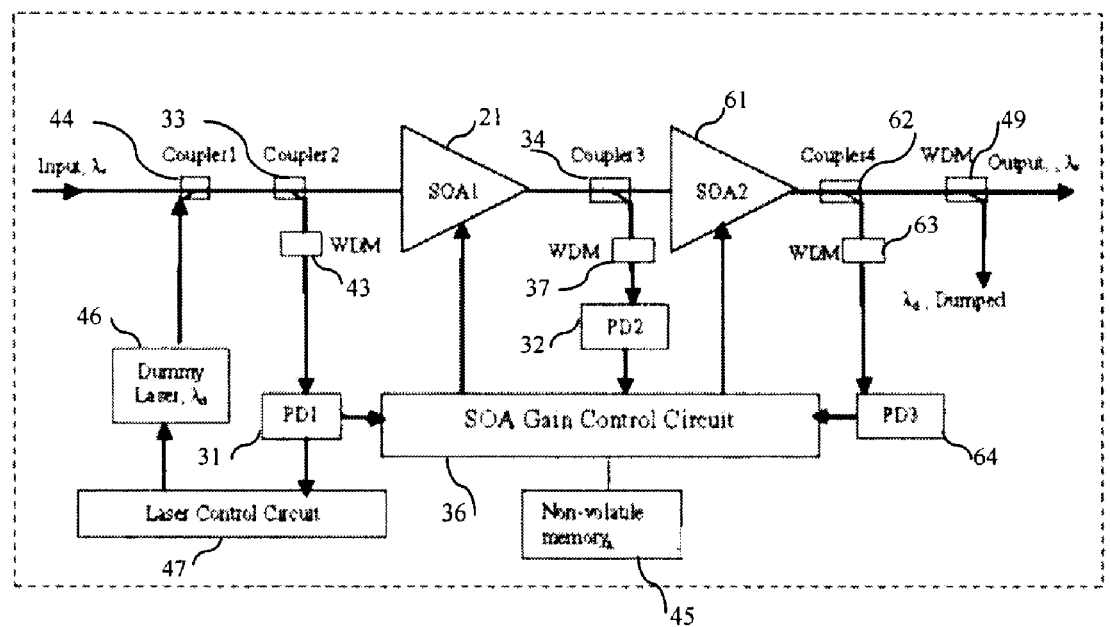
FIG. 6 illustrates another exemplary embodiment of the present invention.

It is noted that commercially available SOAs may not provide sufficient gain for all amplified PON applications. If more gain is necessary, a two-stage amplifier, incorporating a cascade of two or more SOAs, can be utilized. In such a case, a second exemplary embodiment of the present invention can be utilized to control both stages of the SOAs with a single dummy laser. FIG. 6 illustrates an exemplary circuit configuration of the second embodiment of the present invention. Referring to FIG. 6, in addition to the components contained in the first embodiment, the circuit includes a second SOA 61, which receives the output of coupler 34, an optical coupler 62, which taps a portion of the output of a second SOA. This signal is coupled into an optical WDM filter 63, which blocks the upstream burst signal and passes the amplified dummy laser signal. The output of the WDM filter 63 is provided to an optical detector 64, which measures the amplified dummy laser signal. Then, in the same manner as discussed above with the first embodiment regarding the first amplifier stage 25, the relative signal levels measured at the optical detector 32 and the optical detector 64, after initial calibration, can be used to calculate the gain of the second stage SOA 61 in the following manner. If the light incident on optical detector 32 results in photocurrent $I_2$ and the light incident on optical detector 64 results in photocurrent $I_3$, the overall gain G' for the second stage SOA 61 (including the upstream PON signal) is defined by equation 2, which is:

$$G' = a'(I_3/I_2) \qquad \text{Eq. (2)},$$

where a' is the calibration value for the second SOA 61, which is typically not equal to a, the calibration value for the first SOA 25. The calibration value, a', is also stored in the non-volatile memory 45 at the completion of the calibration process. During operation, the SOA gain control circuit 36, which is coupled to optical detectors 32 and 64, and to the non-volatile memory 45, controls the bias applied to the second SOA 61 so as to maintain a constant gain of the second SOA 61 defined by the relationship set forth in equation (2). Of course, in this embodiment, the SOA gain control circuit 36 also provides feedback control of the first SOA 25, as in the first embodiment. Thus, the gain of both the first stage and second stage SOAs gain can be independently controlled using the same dummy laser signal.

Figure 7:
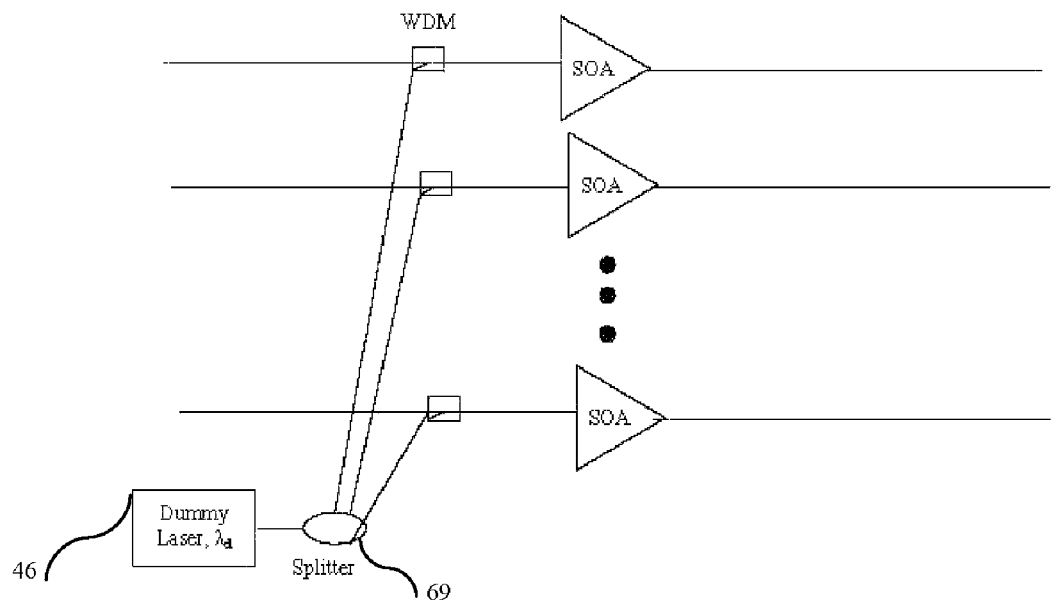
FIG. 7 illustrates an exemplary embodiment regarding the use of a single dummy laser in conjunction with multiple SOAs.

FIG. 7 illustrates an exemplary optical power splitter 69 coupled at its input to the dummy laser 46, and at its outputs to a plurality of WDM filters or optical couplers. These in turn are coupled to the main signal line via the WDM filter or coupler and fed to the SOA amplifiers in the same manner as in the first embodiment illustrated in FIG. 4. FIG. 7 illustrates how a single dummy laser signal can be coupled to multiple SOAs.

Figure 8:
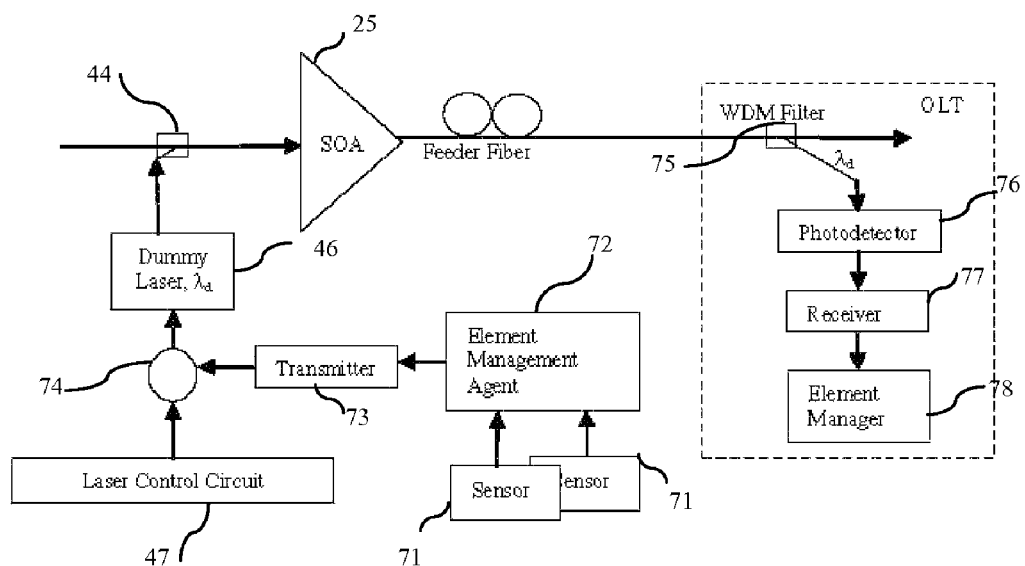
FIG. 8 illustrates another exemplary embodiment of the present invention, which allows for the use of the dummy laser signal for monitoring purposes.

FIG. 8 illustrates an exemplary configuration which allows the use of the dummy laser signal for telemetry purposes. Specifically, FIG. 8 shows the additional components that allow for the foregoing function, and which can be added to any of the foregoing embodiments. It is noted that only the components of the previous configurations necessary to facilitate understanding of the operation of this embodiment, and the required additional components are illustrated in FIG. 8. Referring to FIG. 8, the device includes one or more sensors 71, which operate to monitor the values of operational parameters of the SOA; an element management agent device 72, which may be implemented utilizing a microcontroller, and which operates to collect data from the sensors 71, and to format this received data into messages; a transmitter 73 which operates to place the messages formed by the element management agent 72 into a data packet of a pre-determined format, for example, but not limited to Ethernet frames, serialize the message and transmit the messages as a bit stream at a pre-determined clock rate; and a coupler device 74 operative for combining the message data output by the transmitter 73 with the output of the laser control circuit 47, such that the gain of the dummy laser 46 is modulated when the transmitter 73 is active. At the OLT, the monitoring system further includes a WDM filter 75 which operates to extract the modulated signal from the dummy laser from the aggregate upstream signal. The modulated signal is then detected by a photodetector 76 and recovered and formatted into data packets by the receiver 77. An element manager unit 78 processes the messages in the data packets for further use in managing the SOA and the operation thereof, as well as the PON. Receiver 77 and element manager 78 may be coupled by way of a data communications network, e.g., a local area network, which is not illustrated for simplicity purposes.

The processes described in connection with FIGS. 4-8 may be implemented in hard wired devices, firmware or software running in a processor. A processing unit for a software or firmware implementation is preferably contained in the laser control circuit 47 or also in-part in the SOA gain control circuit 36. Any of these processes may be contained on a computer readable medium which may be read by laser control circuit 47 or also in-part in the SOA gain control circuit 36. A computer readable medium may be any medium capable of carrying instructions to be performed by a microprocessor, including a CD disc, DVD disc, magnetic or optical disc, tape, silicon based removable or non-removable memory, packetized or non-packetized wireline or wireless transmission signals.

Those of skill in the art will appreciate that a computer readable medium may carry instructions for a computer to perform a method of controlling the power level input into an optical amplifier, the method comprising at least the steps of: detecting the power level of a burst signal to be input to an amplifier circuit of the optical amplifier, the burst signal being detected at an input port of said optical amplifier; coupling a dummy laser generation signal to the input port of the optical amplifier; and controlling the power level of a signal output by the dummy laser generation circuit so as to maintain the power level of a signal formed by the combination of said burst signal and the dummy laser generation signal at a substantially constant level, the combination signal being input to the amplifier circuit. The instructions may further include coupling at least a portion of said burst signal to a gain control circuit which is operative for controlling the power level of the signal output by said dummy laser generation circuit; coupling the output of the dummy laser generation circuit with the burst signal so as to form the combination signal; and coupling at least a portion of the combination signal to the gain control circuit.

The present invention provides significant advantages over the prior art systems. Most importantly, the present invention provides a PON network that provides for the processing of upstream burst data signals while maintaining the gain of the SOA at a predetermined level utilizing a simple, cost effective circuit.

The present invention also provides additional advantages over the prior art devices. More specifically, in addition to those already noted above, the present invention may assist in fault sectionalization if the OLT experiences a reduction in upstream optical power, or loss of upstream optical signal. As the dummy laser is isolated from the passive splitter, distribution fibers and drop fibers of the PON network, utilizing the dummy laser signal, it can easily be determined whether the SOA is functional by measuring the gain of the SOA. If the SOA is functional, the problem must be in the fiber plant between the optical amplifier and subscribers. On the other hand, if the SOA gain is not in its nominal range, it can be confirmed that the problem lies with the SOA, and a technician cannot be dispatched to replace it. Without the dummy laser signal to control the SOA in the manner disclosed by the present invention, there is no way to distinguish between such faults.

Although certain specific embodiments of the present invention have been disclosed, it is noted that the present invention may be embodied in other forms without departing from the spirit or essential characteristics thereof. Thus, the present embodiments are therefore to be considered in all respects as illustrative and not restrictive, the scope of the invention being indicated by the appended claims, and all changes that come within the meaning and range of equivalency of the claims are therefore intended to be embraced therein.

What is claimed is:

1. An optical amplifier comprising:
   an amplifier having an input port and an output port, said amplifier disposed along a main signal line of said optical amplifier;
   a dummy laser generation circuit having an output coupled to said main signal line and operative for inputting a dummy signal into said amplifier;
   a first optical detector for detecting a power level of said dummy signal input into said amplifier and outputting a first power level signal;
   a second optical detector for detecting an amplified power level of said dummy signal output by said amplifier and outputting a second power level signal;
   a memory device for storing calibration data regarding the gain characteristics of said amplifier;
   a gain control circuit which receives inputs from said first optical detector and second optical detector, and having an output coupled to said amplifier; said gain control circuit operative for controlling the gain of said amplifier based on said first power level signal, said second power level signal and said calibration data; and
   a laser control circuit which is coupled to said dummy laser generation circuit and which receives an output signal from said first optical detector, said laser control circuit operative for generating a control signal for controlling the amplitude of the dummy signal.

2. The optical amplifier according to claim 1, further comprising:
a first coupler connected to said main signal line and operative for coupling said dummy signal onto said main signal line;
a second coupler connected to said main signal line and operative for coupling at least a portion of a signal output by said first coupler to said first optical detector; and
a third coupler corrected to said main signal line and operative for coupling at least a portion of a signal output by said amplifier to said second optical detector.

3. The optical amplifier according to claim 2, further comprising:
a first filter disposed between an output of said first coupler and an input of said first optical detector, said filter operative for filtering out signals other than said dummy signal such that only said dummy signal is received by said first optical detector; and
a second filter disposed between an output of said second coupler and an input of said second optical detector, said filter operative for filtering out signals other than said dummy signal such that only said dummy signal is received by said second optical detector.

4. The optical amplifier according to claim 1, wherein said memory device comprises a non-volatile memory, and said memory is coupled to said gain control circuit.

5. The optical amplifier according to claim 1, wherein the frequency of the dummy signal is distinct from the frequencies of upstream data signals to be processed by the optical amplifier, said frequency of said dummy signal being within an operating bandwidth of the amplifier.

6. The optical amplifier according to claim 1, wherein said gain control circuit controls the gain of the amplifier such that the gain is maintained at a predetermined level during the normal operation of the optical amplifier.

7. The optical amplifier according to claim 6, wherein upstream data signals to be processed by said optical amplifier include burst data signals.

8. The optical amplifier according to claim 1, wherein said amplifier comprises a semiconductor optical amplifier.

9. A method for controlling the gain of an optical amplifier, said method comprising:
coupling a dummy signal onto a main signal line of said optical amplifier, and inputting said dummy signal into an amplifier, said dummy signal being coupled with an upstream data signal prior to being input into said amplifier;
detecting a power level of said dummy signal input into said amplifier and outputting a first power level signal;
detecting an amplified power level of said dummy signal output by said amplifier and outputting a second power level signal;
storing calibration data regarding the gain characteristics of said amplifier in a memory device;
controlling the gain of said amplifier based on said first power level signal, said second power level signal and said calibration data such that the gain of the amplifier is maintained at a predetermined level during operation of the optical amplifier; and
controlling a laser control circuit based on the first power level and the second power level to generate a control signal for controlling the amplitude of the dummy signal.

10. The method of controlling an optical amplifier according to claim 9, wherein said coupling of said dummy signal onto said main signal line is performed utilizing a first coupler.

11. The method of controlling an optical amplifier according to claim 10, further comprising coupling at least a portion of a signal output by said first coupler to said first optical detector.

12. The method of controlling an optical amplifier according to claim 11, wherein said coupling of at least a portion of a signal output by said amplifier to said second optical detector is performed utilizing a third coupler.

13. The method of controlling an optical amplifier optical amplifier according to claim 12, further comprising:
disposing a first filter between an output of said first coupler and an input of said first optical detector, said first filter operative for filtering out signals other than said dummy signal such that only said dummy signal is received by said first optical detector; and
disposed a second filter between an output of said second coupler and an input of said second optical detector, said second filter operative for filtering out signals other than said dummy signal such that only said dummy signal is received by said second optical detector.

14. The method of controlling an optical amplifier according to claim 9, wherein said calibration data is stored in a non-volatile memory.

15. The method of controlling an optical amplifier according to claim 9, wherein the frequency of the dummy signal is distinct from the frequencies of upstream data signals to be processed by the optical amplifier, said frequency of said dummy signal being within an operating bandwidth of the amplifier.

16. The method of controlling an optical amplifier according to claim 9, wherein upstream data signals to be processed by said optical amplifier include burst data signals.

17. The method of controlling an optical amplifier according to claim 9, wherein said amplifier comprises a semiconductor optical amplifier.

18. A communication system having an optical amplifier, said communication system comprising:
an amplifier having an input port and an output port, said amplifier disposed along a main signal line of said optical amplifier;
a dummy laser generation circuit having an output coupled to said main signal line;
a laser control circuit which is coupled to said dummy laser generation circuit and which receives an output signal from said first optical detector, said laser control circuit operative for generating an output signal which is coupled to said dummy laser generation circuit and which controls the amplitude of the dummy signal;
a sensor for monitoring amplification of said amplifier;
a processor coupled to said sensor, said processor operative for receiving data from said sensor and formatting said data into a transmission format; and
a modulating device operative for modulating the output signal with said data received by said processor; and
a laser control circuit which is coupled to said dummy laser generation circuit and which receives an output signal from said first optical detector, said laser control circuit operative for generating a control signal for controlling the amplitude of the dummy signal
wherein said signal output by said dummy laser generation circuit is a modulated signal containing data received by said processor.

19. The communication system of claim 18, further comprising a receiver having a demodulation device which demodulates the signal output by the dummy laser generation circuit so as to extract the data received by said processor.

* * * * *